Aug. 23, 1960 S. M. FOMENKO 2,950,353

PLIANT DISK MAGNETIC RECORDING APPARATUS

Filed July 5, 1955

S. M. FOMENKO
INVENTOR.

BY Seymour M. Rosenberg
ATTORNEY

United States Patent Office 2,950,353
Patented Aug. 23, 1960

2,950,353

PLIANT DISK MAGNETIC RECORDING APPARATUS

S. M. Fomenko, Los Angeles, Calif., assignor, by mesne assignments, to Litton Industries, Inc., Beverly Hills, Calif., a corporation of Delaware Filed July 5, 1955, Ser. No. 519,843

6 Claims. (Cl. 179—100.2)

Figure 1:
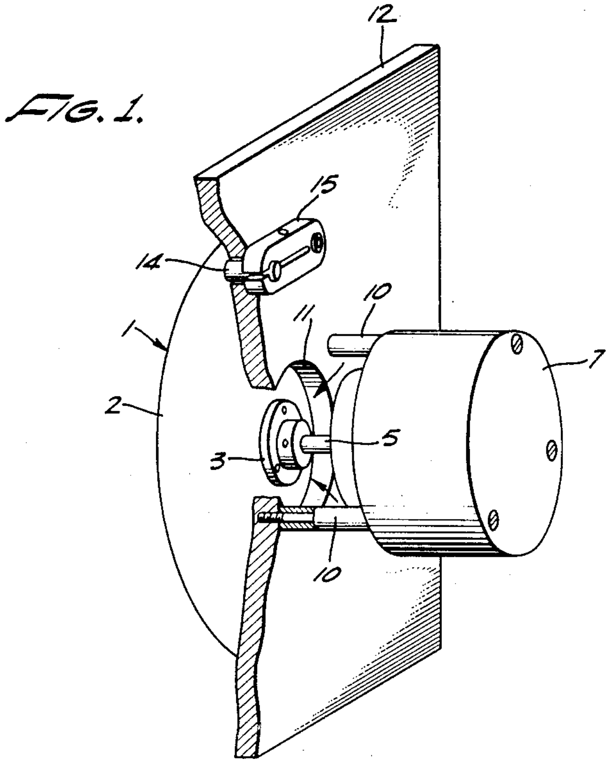

The present invention relates to magnetic recording on moving recording media and more particularly to a magnetic recording apparatus wherein a narrow gap between a magnetic transducer and a moving recording surface is maintained constant by means relatively independent of tolerances in mechanical parts of the apparatus.

In the prior art rigid rotating disks or drums having magnetizable surfaces have been widely used in so-called "non-contact" magnetic recording. The phrase "non-contact" is a term, familiar in the magnetic recording art which is used to designate those types of magnetic recording in which a magnetic transducer is not allow to touch an associated moving recording surface but is instead spaced from the recording surface by a narrow gap. The great advantage of non-contact recording is that since the transducer and the moving recording surface do not touch each other, an unlimited number of cycles or passes of the recording surface beneath the magnetic transducer may be made without injury to either the surface or the transducer.

It is of great importance in non-contact magnetic recording that the gap between the moving recording surface and associated magnetic transducers be made as narrow as is feasible since the amplitude of electrical signals induced in a magnetic transducer by a moving recording surface is directly related to the spacing between the surface and the transducer. In the prior art, in an effort to obtain maximum signal amplitude, gap spacings of less than .005 inch are commonly used and some percision recording apparatus has been constructed wherein gap spacings of about .001 inch are used.

To a large extent, in the prior art efforts to obtain very narrow gap spacing having been restricted by the difficulties attendant in maintaining such gap spacing at a constant dimension without cyclic variations occasioned either by eccentric rotation or "wobble" of the record surfaces as they rotate past the magnetic transducer.

For example, it is quit clear that if a magnetic drum could be made to run perfectly true without any run-out or eccentricity in operation, then a magnetic transducer could be positioned very nearly as close to the drum surface as desired, the spacing between transducer and drum then being limited only by the expected wear of the drum bearings and by possible differential thermal expansion between the drum and the structure which supports the transducer adjacent the drum. However, if any eccentricity or "run-out" of the drum does exit, then the transducer must be spaced further from the surface both to avoid destructive contact with the high point of the eccentric drum and to reduce the severity of cyclic amplitude modulation of the transducer output signal caused by corresponding cyclic variation in gap spacing as the eccentric drum rotates beneath the transducer. Extreme amplitude modulation of the transducer output signal is undesirable because it necessitates greatly increased complexity in amplifier circuits associated with the transducer.

For the above described reasons, in prior art drum recording apparatus great efforts are made to reduce drum eccentricity so as to, in this manner, keep gap spacing constant. To obtain this reduction of drum eccentricity very close tolerances are maintained in the mechanical parts of the apparatus. Drum spindles are centerless ground, the highest precision bearings are utilized, and great care is exercised in the machining and finishing of drum surfaces. A prior art magnetic drum apparatus is therefore a piece of fine precision machinery, quite expensive to produce and not easily produced in quantity by assembly line methods. Moreover, such an apparatus is easily perturbed or injured by extremes of heat or cold which tend to produce differential expansions between parts of the apparatus.

A somewhat similar situation prevails with respect to magnetic disk recording apparatus in which a magnetic transducer is positioned adjacent a plane surface of a rotating disk. Any angular misalignment of the surface plane with respect to the axis of rotation of the disk, causes a cyclic "wobble" of the surface as the disk rotates, thereby causing a corresponding cyclic variation in the spacing between the surface and the magnetic transducer. The amplitude of gap variation caused by this effect is proportional to the radial distance between the transducer and the disk center. As a result, recording upon a disk surface may be accomplished successfully when the magnetic transducer is at a relatively small radial distance from the disk center but may not be feasible if the magnetic transducer is positioned near the periphery of the disk at a large radial distance from the disk center. Disk "wobble" therefore imposes serious restrictions on the general utility of magnetic disk recording since only limited amounts of information can be recorded in a circular magnetic track of a small radius. Through close mechanical tolerances and precision machining, "wobble" of a magnetic disk may be greatly reduced. However, the problems presented are so formidable that little or no use is made in the prior art of "non-contact" recording on magnetic disks.

In contrast to prior art magnetic recording apparatus, the present invention provides a magnetic recording apparatus wherein an extremely narrow gap between a magnetic transducer and a moving recording surface is maintained constant by means relatively independent of tolerances in mechanical parts of the apparatus.

According to the basic concept of the present invention recording is accomplished upon a sheet of flexible or pliant material which is rotated about a predetermined axis so that by reason of the centrifugal forces thereby produced the unclamped peripheral portions of the pliant record sheet are forced outwardly until they form a stationary surface of revolution rotating about the predetermined axis. Because of the pliant nature of the sheet material the peripheral portions of the surface of revolution formed by the rotating sheet material may be readily positioned by extremely small forces.

Air which becomes frictionally engaged with the surface is thrown outward along the surface by the centrifugal forces caused by rotation on the surface. It is believed that in this manner an outward moving layer of air is formed which cushions the surface from actual contact with a transducer head which is positioned adjacent the periphery of the surface. As a result of this mode of operation gap spacing between the surface of the rotating sheet and the magnetic transducer is determined by the moving layer or cushion of air rather than by tolerances in mechanical parts of the apparatus.

In a preferred embodiment of the invention the recording sheet is provided as a thin disk of plastic material which is centrally clamped to a hub mounted on the shaft of an electric motor. The plane of rotation of the disk is positioned parallel to the surface of a stationary plate in which magnetic transducers are mounted. According to the presently understood theory of operation, when the disk is rapidly rotated air in contact with the disk surfaces is frictionally engaged by the disk and swept around with the disk. The resultant centrifugal forces acting upon the air particles cause the engaged air to be outwardly pumped between disk and plate thereby establishing a gap between the disk and plate. Since the outwardly pumped air has a substantial velocity, in accordance with Bernoulli's principle the pressure between disk and plate is reduced thus tending to further reduce the gap between disk and plate until an equilibrium condition is reached at which the Bernoulli forces are balanced by the effects of the moving air in pushing apart disk and plate.

When this equilibrium condition is attained, the gap between the record disk and the plate is maintained at a very constant dimension, there being little cyclic variation of the gap dimension with rotation of the disk. Because of this constancy of the gap dimension, very narrow gap spacing may be utilized of the order of .0005 of an inch. Gap spacing may be adjusted by varying the spacing of the disk clamping hub with respect to the plate.

In the preferred embodiment of the invention a central orifice is provided in the transducer mounting plate to provide a continuing source of air which may be outwardly pumped by the rotating disk. By forming this orifice so that it is concentric with the disk periphery an arrangement is provided which produces an extremely symmetrical flow of air over all surfaces of the disk so that any tendency of the edges of the disk to flutter or vibrate is greatly decreased. However, excellent results may be obtained with far less symmetrical arrangements and therefore, although a concentric positioning of the disk and the orifice is a preferred feature of the invention it is not believed to be essential.

It will be understood that the rate of air flow produced by the centrifugal pumping action of the record disk is quite low and that therefore the actual mechanical forces on the sheet material are relatively slight. However, because of the pliant nature of the material of the disk, these slight forces are fully effective for positioning the disk periphery and for maintaining a constant gap between the disk and plate. It is believed at this time that in addition to the Bernoulli forces, additional forces electrostatic in nature are effective in constraining the periphery of the disk toward the plate thus narrowing the gap considerably below the spacing which would be obtained by reason of the Bernoulli forces alone. The nature and action of these electrostatic forces is not fully understood. However, they appear to have only a constant unvarying effect on gap spacing and may therefore be fully compensated for by adjustment of the spacing of the disk clamping hub with respect to the plate.

It is therefore an object of the present invention to provide a magnetic recording apparatus wherein a narrow gap between a magnetic transducer and a moving recording surface is maintained constant by means relatively independent of tolerances in mechanical parts of the apparatus.

It is another object of the invention to provide in a non-contact magnetic recording apparatus a rotating magnetic recording surface comprising a pliant record sheet centrally connected to a rotating member and thereby rapidly rotated about a predetermined axis so that by reason of the resultant centrifugal forces produced the unclamped portions of the record sheet are formed into a surface of revolution smoothly rotating about the predetermined axis.

It is still another object of the invention to provide a magnetic recording apparatus wherein a magnetic transducer is positioned at a narrow gap spacing from one surface of a pliant record sheet connected to a rapidly rotating member for rotation with the member and formed to the shape of a surface of revolution by the centrifugal forces thereby applied to the elements of the rotating sheet.

It is yet another object of the invention to provide a magnetic recording apparatus wherein a rapidly rotated record disk formed into a sheet of revolution by the resultant centrifugal forces is positioned parallel to and closely adjacent a stationary plate wherein a magnetic transducer is mounted, air frictionally engaged by the disk being pumped outwardly between disk and plate by centrifugal force arising from rotation of the disk, whereby the outwardly pumped air causes Bernoulli forces to be exerted which position the disk periphery at a substantially constant spacing from the plate.

It is a further object of the invention to provide a magnetic recording apparatus wherein a rapidly rotated pliant record disk centrifugally formed to the shape of a surface of revolution is concentrically positioned with respect to an orifice in a plate wherein a magnetic transducer is mounted, air being drawn through said orifice and pumped symmetrically outward between the disk and plate by centrifugal forces arising from rotation of the disk, whereby the outwardly pumped air causes Bernoulli forces to be exerted which position the disk periphery at a substantially constant spacing from the plate.

The novel features which are believed to be characteristic of the invention both as to its organization and method of operation, together with further objects and advantages thereof will be better understood from the following description considered in connection with the accompanying drawings in which a preferred embodiment of the invention is illustrated by way of example. It is to be expressly understood however that the drawings are for the purpose of illustration and description only and are not intended as a definition of the limits of the invention.

Figure 2:
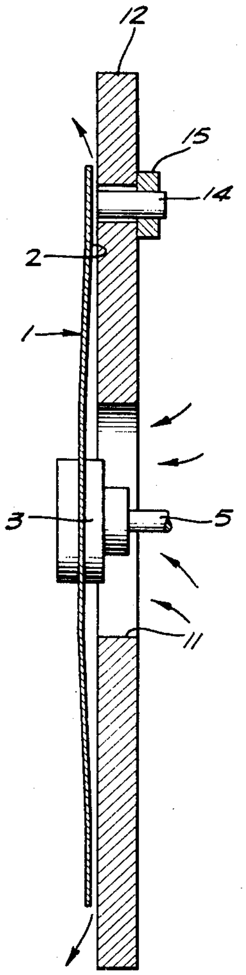

Fig. 1 is a perspective view partly in section of a preferred embodiment of a magnetic recording apparatus according to the present invention; and Fig. 2 is a sectional view of the magnetic recording apparatus shown in Fig. 1, wherein certain dimensions are drawn to a magnified scale to better illustrate the operation of the invention.

Referring now to the drawings there is shown in Fig. 1 a magnetic recording apparatus according to the present invention comprising a pliant disk 1 of plastic or other suitably flexible relatively limp material having a magnetizable surface 2, disk 1 being centrally clamped to a hub 3 which is mounted on a shaft 5 of an electric motor 7. Motor 7 is mounted on a plate 12, by means of mounting studs 10, so that shaft 5 protrudes through an orifice 11 in plate 12, disk 1 thereby being positioned so that its magnetizable surface 2 is contiguous to one surface or face (designated the front face) of plate 12 while motor 7 is positioned adjacent the opposite face (designated the back face) of plate 12. A conventional magnetic transducer 14 of the type having an active magnetic gap at one end thereof is positioned, by a clamp 15, so that it extends through an orifice in plate 12 to the front face of plate 12, the active magnetic gap of transducer 14 thereby being stationed adjacent to the magnetizable surface 2 of disk 1 at a point close to the periphery of disk 1.

In operation, when motor 7 is energized for rotation of shaft 5, disk 1, since its central section is clamped to hub 3 of shaft 5, is constrained to rotate with shaft 5. The velocity of rotation is high enough so that by reason of the centrifugal forces thereby produced the unclamped portions of disk 1 are formed to the shape of a surface of revolution about a predetermined axis corresponding to the central axis of shaft 5.

As illustrated in the preferred embodiment of the invention shown in Fig. 1, motor 7 is mounted so that the axis of shaft 5 is substantially perpendicular to the front face of plate 12. Because of this orientation of shaft 5, when shaft 5 is rotated in the described manner the plane of rotation established by the periphery of disk 1 is substantially parallel to the front face of plate 12. Spacing between disk and plate 12 may be varied through adjustment of mounting studs 10.

Ordinarily this adjustment is made in such a way that the plane of rotation of the disk periphery tends to be positioned at a narrow initial spacing from the front face of plate 12. However, in operation, this initial spacing between the disk periphery and the front face of plate 12 is decreased still further by forces which act upon the disk periphery and which tend to draw the disk periphery towards plate 12 and position the disk periphery at a very narrow constant spacing from the front face of plate 12. The nature of these forces as presently understood will now be explained.

When, in operation, the disk is rapidly rotated it is believed that air in contact with the surface 2 of disk 1 is frictionally engaged and swept around with the disk. The resultant centrifugal forces acting upon the air particles cause the engaged air to be outwardly pumped between disk 1 and plate 12. The moving layer of air acts as a cushion which prevents disk surface 2 from coming into contact with the front face of plate 12. However, since the outwardly pumped air has a substantial velocity, in accordance with Bernoulli's principle, the pressure between disk and plate is reduced thus tending to further reduce the gap between the disk periphery and plate 12, until an equilibrium condition is reached at which the Bernoulli forces which draw the disk periphery towards the plate are balanced by other effects, notably the effect of the moving layer of air in separating the disk from the plate.

When this equilibrium condition is obtained the gap between the periphery of disk 1 and plate 12 is maintained at a relatively constant dimension, there being little or no cyclic variation of the surface of the disk. Because of this constancy of the gap dimension very narrow gap spacings of the order of .0005 of an inch may be utilized between surface 2 of disk 1 and magnetic transducer 14. As a result relatively high signal levels with little cyclic amplitude modulation are obtained in the reading with transducer 14 of magnetic signals recorded on surface 2 of disk 1. It is preferred in the operation of the invention that the active end of transducer 14 be positioned flush with the front surface of plate 12 since this configuration produces minimum disturbance of the symmetry of air flow and thus tends to prevent flutter of the disk periphery. However it has been found in practice that good operation may be obtained even through the end of transducer 14 protrudes beyond front surface 12.

Visualization of the paths of air flow through orifice 11 and between disk 1 and plate 12 will be greatly aided by reference to Fig. 2 wherein is illustrated a side view, in section, of a portion of the preferred magnetic reading apparatus shown in Fig. 1. In Fig. 2 certain dimensions have been necessarily drawn to a greatly enlarged scale because of the impossibility of presenting these dimensions in their true scale. For example, a spacing of the order of .0005 of an inch between disk 1 and the front surface of plate 12 cannot be shown in correct scale and it is therefore drawn to a greatly enlarged scale.

As shown in Fig. 2, in the preferred embodiment of the invention orifice 11 is centrally located with respect to the periphery of disk 1. In operation, when disk 1 is rapidly rotated about the axis of shaft 5 and thereby centrifugally formed to the shape of a surface of revolution, as shown in Fig. 2, air particles are frictionally engaged by surface 2 of disk 1 and whirled about with the disk, the resultant centrifugal force pumping air outward between surface 2 and the front surface of plate 12. The general path of this outward pumped air is indicated by arrows as shown in Fig. 2. Orifice 11 is formed in plate 12 to provide a continuing source of air which may be outwardly pumped by rotating disk 1. As indicated by arrows in Fig. 2, as air is centrifugally pumped outward by the rotation of disk 1 additional air is drawn in through orifice 11.

Since, as shown in Fig. 2, orifice 11 is concentric with the disk periphery an extremely symmetrical flow of air over all surfaces of the disk is produced so that any tendency of the disk to flutter or vibrate is greatly decreased. However, it should be understood that good results may be obtained even with non-concentric positionings of orifice 11 with respect to the periphery of disk 2 and such concentricity, although a preferred feature of the invention, is not believed to be essential. In addition, those skilled in the art will readily perceive that the single orifice 11 may be replaced by multiple orifices without in any way varying the fundamental nature of the invention.

It will be understood that the rate of air flow produced by the centrifugal pumping action of disk 1 is quite low and that therefore the actual mechanical forces upon the periphery of disk 1 are relatively slight. However, because of the pliant nature of the material of disk 1 these slight forces are fully effective for positioning the disk periphery and for maintaining a constant gap between disk and plate. For example, in one successful embodiment of the invention the material from which disk 1 is fabricated is Mylar plastic having a thickness of .002 of an inch, the plastic being coated on one side with a thin (.0006 inch) layer of iron oxide to provide magnetizable surface 2. The mechanical compliance of this plastic material is so high that for a disk fabricated thereof internal stresses and bending moments within the material have a negligible effect upon the positioning of the disk periphery, the position of the disk periphery being almost entirely controlled by the relatively slight aerodynamic and Bernoulli forces hereinbefore described.

Numerous experiments appear to indicate at this time that in addition to the Bernoulli forces acting upon the disk periphery additional forces electrostatic in nature are effective in constraining the periphery of the disk towards the plate thus narrowing the gap between disk and plate below that point which would be attained by use of the Bernoulli forces alone.

The most probable explanation of this effect is that charge is stored upon the relatively non-conductive surface of disk 1 by the rubbing action of air particles against the disk, these uncompensated electric charges causing force of attraction between disk 1 and plate 12. These electrostatic attractive forces appear to have only a constant, unvarying effect on gap spacing and may therefore be fully compensated for by initial adjustment of the spacing of disk 1 with respect to plate 12.

What is claimed as new is:

1. In a non-contact magnetic recording device, the combination comprising: a rotatable shaft having an axis; means energizable for rotating said shaft at a preselected velocity; and a pliant record sheet mounted on said shaft and rotatable thereby, said pliant sheet having a magnetizable surface, at least the peripheral portion of said sheet having negligible internal stresses thereby being normally limp and pliable, said sheet, when rotating, responding to centrifugal force to assume substantially the configuration of a surface of revolution having an axis substantially coincident with the axis of said shaft.

2. The combination defined by claim 1 wherein said record sheet is a disk of pliant material having a magnetizable surface and wherein said shaft for rotating said disk is centrally connected to said disk.

3. The combination defined by claim 2 which further includes a magnetic transducer and mounting means connected to said transducer for positioning said transducer at a predetermined spacing from said magnetizable surface of said disk.

4. A magnetic reading device including a pliant record disk having a magnetizable surface and apparatus for forming said record disk to the shape of a predetermined surface of revolution, said apparatus comprising, means centrally connected to said record disk for rotating said disk about a predetermined axis to centrifugally form said disk substantially to the shape of a surface of revolution about said axis, each element of the disk periphery substantially lying in a common plane of rotation, and a plate positioned parallel to said common plane of rotation and at a predetermined spacing therefrom, said plate having an air entrance orifice extending therethrough at a position interior with respect to the disk periphery, whereby rotation of the disk causes air to be drawn through said orifice and centrifugally pumped outward between said plate and said disk thereby causing Bernoulli forces which position the disk periphery at a substantially constant narrow spacing from said plate.

5. The magnetic reading device defined by claim 4, wherein said air entrance orifice extends through said plate at a position centrally located with respect to the disk periphery.

6. A magnetic reading device including a pliant record disk having a magnetizable surface and apparatus for forming said record disk to the shape of a predetermined surface of revolution, said apparatus comprising: means centrally connected to said record disk for rotating said disk about a predetermined axis to centrifugally form said disk substantially to the shape of a surface of revolution about said axis, each element of the disk periphery substantially lying in a common plane of rotation, a plate positioned parallel to said common plane of rotation and at a predetermined spacing therefrom; and means for admitting air to the region between said plate and disk at a position interior with respect to the disk periphery, whereby rotation of the disk causes air to be centrifugally pumped outward between said plate and said disk thereby causing Bernoulli forces which position the disk periphery at a substantially constant narrow spacing from said plate.

References Cited in the file of this patent

UNITED STATES PATENTS

| | | |
|---|---|---|
| 2,038,216 | Harrison et al. | Apr. 21, 1936 |
| 2,603,539 | Brewster | July 15, 1952 |
| 2,737,646 | Muffly | Mar. 6, 1956 |
| 2,750,579 | Lekas et al. | June 12, 1956 |
| 2,772,135 | Hollabaugh et al. | Nov. 27, 1956 |
| 2,787,513 | Carleton | Apr. 2, 1957 |
| 2,899,260 | Farrand et al. | Aug. 11, 1959 |

FOREIGN PATENTS

| | | |
|---|---|---|
| 509,458 | Great Britain | July 17, 1939 |
| 586,532 | Germany | Oct. 5, 1933 |
| 1,119,186 | France | Apr. 3, 1956 |